United States Patent
Voss et al.

(10) Patent No.: US 6,425,198 B2
(45) Date of Patent: Jul. 30, 2002

(54) METHOD FOR MAKING A TWO PART RESERVOIR AND RESULTING RESERVOIR

(75) Inventors: Norbert Voss, Offenbach (DE); Edgar Hipp, Limonest (FR)

(73) Assignee: Rowenta Werke GmbH, Offenbach (DE)

( * ) Notice: Subject to any disclaimer, the term of this patent is extended or adjusted under 35 U.S.C. 154(b) by 0 days.

(21) Appl. No.: 09/858,866

(22) Filed: May 17, 2001

Related U.S. Application Data

(63) Continuation of application No. PCT/IB99/01984, filed on Nov. 9, 1999.

(30) Foreign Application Priority Data

Nov. 17, 1998 (FR) .................................. 98 14586

(51) Int. Cl.⁷ .................................................. D06F 75/14
(52) U.S. Cl. ..................................................... 38/77.8
(58) Field of Search .................... 38/88, 77.8; 219/245; 277/609

(56) References Cited

U.S. PATENT DOCUMENTS

| | | | |
|---|---|---|---|
| 4,115,935 A | | 9/1978 | Toft |
| 4,190,762 A | * | 2/1980 | Santiago et al. ............ 219/245 |
| 5,222,746 A | * | 6/1993 | Van Steenbrugge |
| 5,398,434 A | * | 3/1995 | Biancalani .................. 38/77.8 |
| 6,151,815 A | * | 11/2000 | Cuzel et al. ................. 38/77.8 |

FOREIGN PATENT DOCUMENTS

| | | |
|---|---|---|
| DE | 28 21 134 | 11/1978 |
| EP | 0 683 031 | 11/1995 |
| FR | 2 318 970 | 2/1977 |
| FR | 2 322 233 | 3/1977 |
| FR | 2 774 102 | 7/1999 |
| JP | 60 183000 | 9/1985 |
| JP | 61193815 | 8/1986 |
| JP | 62 87315 | 4/1987 |
| JP | 59165632 | 9/1994 |

* cited by examiner

*Primary Examiner*—Ismael Izaguirre
(74) *Attorney, Agent, or Firm*—Browdy and Neimark

(57) ABSTRACT

A water reservoir for a clothes pressing iron, the reservoir being composed of two plastic parts, and a method for fabricating the reservoir by: simultaneously molding the two parts of one reservoir in a first injection molding step in two impressions of the same mold; and assembling the two parts together while, in a second injection molding step, injection molding a joint of plastic material between the two parts to connect the two parts together in a fluid-tight manner, wherein the two parts are assembled together and the second injection molding step is performed before complete crystallization of the two parts.

14 Claims, 3 Drawing Sheets

METHOD FOR MAKING A TWO PART RESERVOIR AND RESULTING RESERVOIR

REFERENCE TO OTHER APPLICATIONS

This is a continuation of International Application PCT/IB 99/01984, filed Nov. 9, 1999.

BACKGROUND OF THE INVENTION

The present invention relates to clothes pressing appliances, such as pressing irons or steam generators, having a reservoir for water that is subsequently converted into steam to assist a clothes-pressing operation.

Numerous techniques for fabricating such a reservoir are already known in the art. For example, the technique of blow molding is known, but is little used because it does not permit achievement of the precise dimensions necessary for mass production, given that the reservoirs are normally made in two parts that must be assembled together. Water tightness must then be achieved by providing a flexible seal that is compressed between the two parts, as described in German patent document DE 2 821 134, which requires a considerable amount of work for installing the seal. The two parts can also be joined by cementing or welding them together, as described in French patent document FR 2 322 233 or Japanese document JP60-183000, on assembly lines when they are made of plastic material, or by rolling and crimping of the edges when at least one part is of metal.

Thus, French patent No. FR 2318970 describes a water reservoir for a clothes pressing iron, the reservoir being made of two parts, one of which is transparent and the other of which is preferably of metal. The two parts are assembled together with a joint that is preferably of silicone and is elastic, the joint being interposed between the base and the cover of the reservoir.

In all of these techniques in which the reservoir is made of two parts that are assembled together, a substantial amount of time and materials are used on pressing iron assembly lines, whether this be for placing the joint, cementing, welding, or crimping, and it is necessary to have on hand a substantial number of parts that are awaiting assembly or are being operated on. This creates the risk of a delayed detection of defects in a lot of parts, and the difficulties of managing the two parts of each reservoir.

The patents JP 59-165632 or EP 683031 describe processes in which two parts are molded in a mold and then assembled together with a joint molded onto the two parts in the same mold. For this purpose, the mold is made of three parts including a central part which is movable or displaceable so that the other two mold parts containing the parts that have been molded in a first phase can be brought together and a joint can then be molded in a second phase on the perimeter of the other two parts that have been molded.

The patents JP 62-087315 and JP 61-193815 both describe processes having the same characteristics for producing a hollow body in the same mold in two successive cycles. The mold has two parts, one of which slides after a first phase of molding the two parts. In the second phase, the edges of the two parts are brought together and a joint is molded.

However, if appropriate precautions are not taken, a reservoir produced according to one of the prior art techniques and subjected to repeated temperature fluctuations, as inevitably occurs in clothes pressing irons, will with time experience leaks due to failure of the joint. Thus, these reservoirs are not highly durable.

BRIEF SUMMARY OF THE INVENTION

A basic object of the invention is to overcome these drawbacks and difficulties.

Basically, the invention provides a method for the fabrication of clothes pressing iron water reservoirs made of two parts, in such a manner as to eliminate the need for storing parts upstream of the assembly stations for the reservoirs and eliminating specific means for sealing the reservoirs on the pressing iron production lines.

The invention also provides a reservoir made of two parts of injection molded plastic material, the reservoir having a sealing joint that is injection molded and intimately linked while hot to the two parts, constituting this reservoir, according to the method of the invention.

The method according to the invention achieves a high level of productivity, adapted to large-scale mass production.

More specifically, the invention provides a method for fabricating water reservoirs for clothes pressing irons, each reservoir being composed of two plastic parts, the method comprising: simultaneously molding the two parts of one reservoir in a first injection molding step in two impressions of the same mold; and assembling the two parts together while, in a second injection molding step, injection molding a joint of plastic material between the two parts to connect the two parts together in a fluid-tight manner, wherein the two parts are assembled together and the second injection molding step is performed before complete crystallization of the two parts.

Thus, the two parts that are molded in an injection molding cycle are immediately used and assembled in the following cycle without any intermediate storage. The molding machine delivers finished reservoirs ready to be installed in pressing irons. The molded parts are assembled before their complete crystallization and therefore while still soft so that they can easily conform to one another. In addition this allows the two parts and the sealing joint to easily conform to one another. During injection molding of the joint, the joint material, being in a softened or liquid state, supplies heat and softens or remelts the surface of each part of the reservoir. This is facilitated by the fact that the crystallization of these parts, or at least the portions in contact with the joint, has not yet been completed and thus local remelting of material of the parts in contact with the joint requires less energy.

Preferably, on the one hand the material of the joint, and on the other hand the material of each of the reservoir parts, are selected to be of identical composition or of compatible compositions in order to form alloys or in order to adhere well to one another. There is then locally produced a diffusion, a mixing, or an alloying between the materials of the joint and of each part. The crystallization of the constituent parts of the reservoir not having been completed at the moment of injection of the joint material, the crystals of the joint and of each part can be organized and bond together more easily at the junction, or interface, surfaces, which causes the bonding of the joint with each of the parts to be very solid.

According to a preferred version of the method of the invention, the two constituent parts of the reservoir are molded in two impressions of the mold, ejected before complete crystallization, and picked up and assembled in another impression of the same mold specifically provided for injection of the joint and assembly of the reservoir. A first reservoir that has just been assembled is ejected from its assembly impression and simultaneously the reservoir parts for the following reservoir, that were molded during assembly of the first reservoir are ejected and picked up for example by a robot arm which puts them in place in the assembly impression that is then empty. Thus, there is no intermediate storage of pair of reservoir parts.

According to another version of the method of he invention, the mold is composed of three parts, a first part having an impression of one of the parts of the reservoir, a second part of the mold having an impression of the other part of the reservoir and, between the first two parts of the mold, a central part having impressions, or recessed portions, that are complementary to the impressions of the first and second mold parts. The machine is constructed to provide two mold closing positions. When the three parts of the mold are closed against one another, the two parts of a reservoir are injection molded. Then the mold is opened without ejecting the reservoir parts from their impressions, after which the central part of the mold is withdrawn. The mold then having only its first two parts is closed again, placing the two corresponding reservoir parts in contact with one another. The joint is then injection molded into a space that has been left free between the reservoir parts and previously occupied by the central part of the mold. The mold is again opened and the finished reservoir is ejected without any handling of the reservoir parts having taken place. With respect to this version of the invention, the necessary operating cycle is doubled but the absence of manipulations can be a significant advantage.

The invention also provides a water reservoir for a clothes pressing iron, the reservoir comprising two plastic parts and a sealing joint joining the two parts together while forming a fluid-tight seal between the two parts, wherein the two plastic parts and the joint are injection molded, each of the plastic parts has an edge having a bearing and positioning face via which the plastic parts contact one another, the joint is a body that is injected molded to the edges to join the two parts together, and the parts and the joint are made of the same material or materials that are compatible with one another to form alloys or to adhere to one another.

Preferably, the two parts of the reservoir are formed to have, along their facing edges, faces for supporting on another. This permits a very precise assembly, the precision of which does not depend on the joint. In addition, the mutual supporting of the reservoir parts creates a tight seal opposing a flow of the injection molded joint, at least toward the interior of the reservoir.

Preferably, the supporting faces provided by the two parts of the reservoir are also centering faces. Thus, two reservoir parts, even though incompletely crystallized, can be assembled more easily.

In a preferred form of construction of the reservoir, the faces of the two reservoir parts that bear against one another include on a first part a groove that is of substantially trapezoidal cross-section along the edge of the first part, and on the second part a tapered edge of substantially trapezoidal cross-section, the edges of which are adjusted to the groove in the first part. The base of the groove of the first part and the peak of the edge of the second part are spaced apart and the joint is injected into that space. This arrangement permits centering of the parts with respect to one another and assures a tight seal during injection of the joint, so that the joint is not noticeable on the reservoir. In addition, since no surface of the joint is in contact with the mold, losses of heat are less rapid toward the mold and more of the heat is available to modify the surfaces of the edges of the reservoir parts.

Preferably at least one of the reservoir parts has, along the edge in contact with the joint, a raised portion of small cross-section with respect to the cross-section of the joint and in the form of a blade that penetrates into the joint. This thin raised portion is easily softened or remelted upon injection of the joint material, offering a high degree of certainty that at least in the zone where the raised portion is attached to its associated part, the bond between that part and the joint will be of high quality, thereby causing the result of the process to be more reliable.

DETAILED DESCRIPTION OF THE INVENTION

Figure 1:
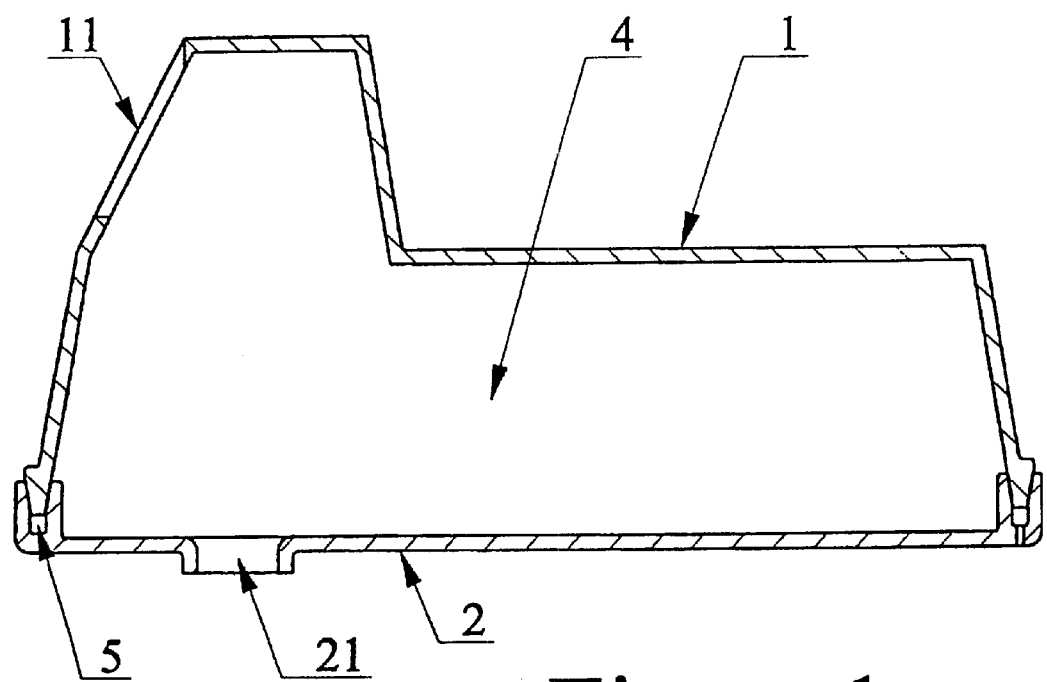
FIG. 1 is an elevational, cross-sectional view of a preferred embodiment of a reservoir according to the invention.
Figure 2:
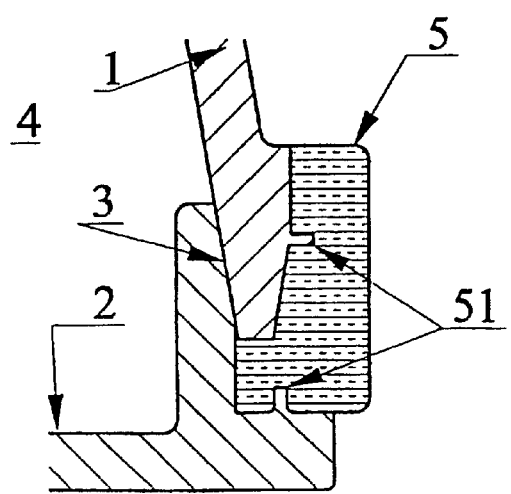
FIGS. 2 and 3 are cross-sectional detail views of two forms of construction for the region at which the two parts of a reservoir are connected together.

FIG. 1 shows a preferred form construction of the reservoir according the invention, composed of an upper part 1 having an opening 11 for filling the reservoir and a lower part 2 having a water outlet opening 21. Referring now to FIG. 2 in conjunction with FIG. 1, the edges of the two parts have corresponding configurations and are connected to one another via at least one mutual bearing face 3 bordering the interior volume of the reservoir, which is thus sealed except for openings 11 and 21. The mutual bearing face 3 is inclined, as shown, in a manner such that upper part 1 is easily fitted and centered on lower part 2. Parts 1 and 2 are each preferably made of injection-molded polypropylene.

Upper part 1 is permanently joined to lower part 2 by a joint 5 that is preferably also made of polypropylene. Preferably joint 5 encloses mutual bearing face 3. Preferably also, one or both parts 1, 2 has along its edge at least one projecting portion 51 in the form of a lip or thin blade that penetrates into, and is in intimate contact with, joint 5.

Figure 4:
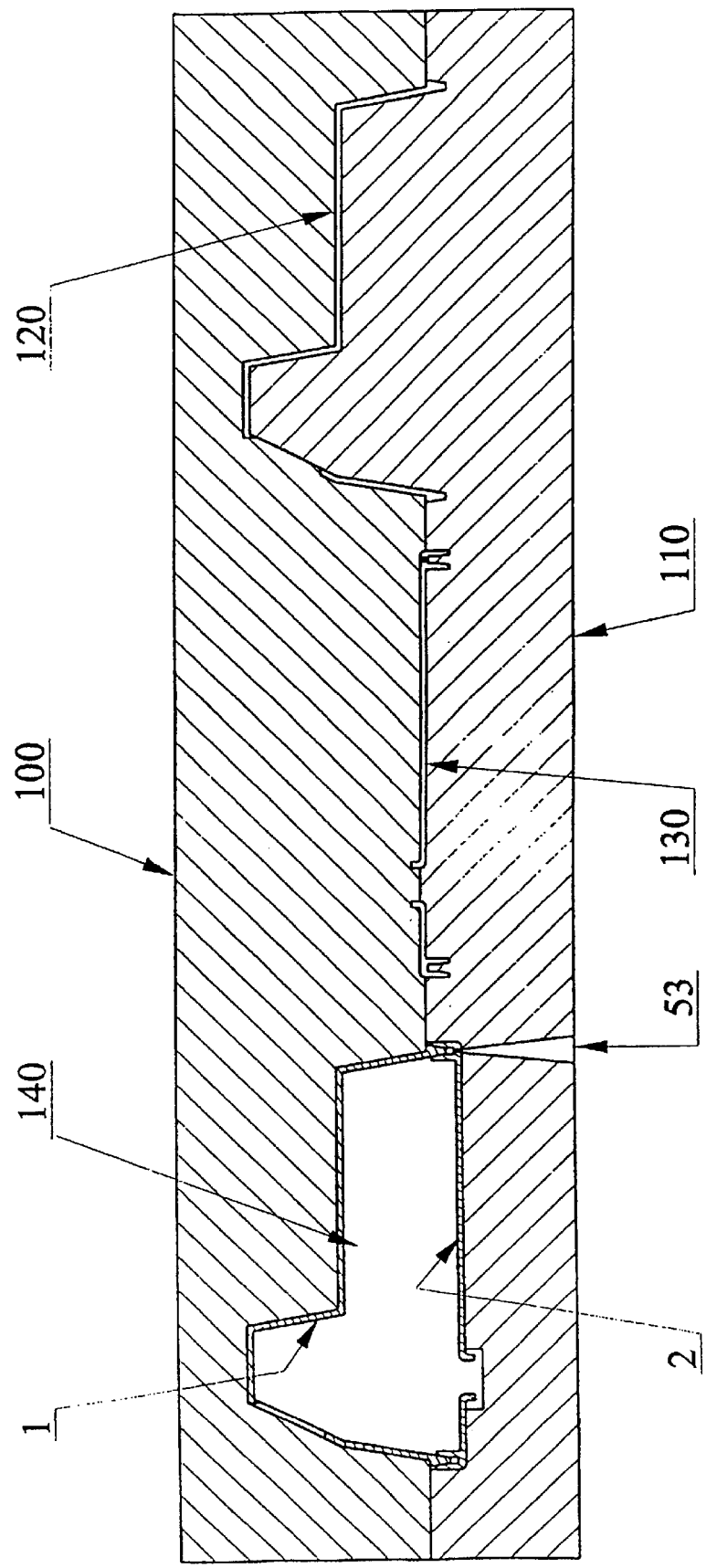
FIG. 4 is an elevational, cross-sectional view of a first embodiment of a mold employed in the practice of the method according to the invention.

According to one embodiment of the process of the invention, the reservoir is fabricated in an injection mold as shown in FIG. 4. This mold is composed of two parts 100 and 110 which are formed to correspond to one another and to be joined together. These two parts 100 and 110 form: a first molding impression 120 for molding upper reservoir part 1; a second molding impression 130 for molding lower reservoir part 2; and an impression 130 for assembly of the two parts and the molding of joint 5. During a first injection molding operation, impression 140 is empty and its channels, such as 53, for supplying plastic material to form the joint are closed by a damper or register. Plastic is injected to fill impressions 120 and 130 and one set of upper and lower parts is formed. After they have solidified but not yet completely crystallized, the mold is opened, a suitable handling device, such as a robot, is advanced and the parts are ejected into the grippers of the robot, which positions them in assembly impression 140. In this step, one reservoir part is inserted into mold part 100 and the other into mold part 110. The robot is withdrawn and the mold is closed, bringing the reservoir parts into contact with one another via their mutual bearing face 3.

During the following injections of plastic, the supply channels of assembly impression 140 are opened and, simultaneously with the molding of two new parts 1 and 2 in impressions 120 and 130, material to form joint 5 is injected into impression 140, for example via channels 53, at the edges of parts 1 and 2, which are in contact with another. On the one hand, the joint material in a molten state is held in the impression by the walls of the mold and, on the other hand, it is retained by the edges of the reservoir that are in sealing contact by the bearing face 3 and cannot flow into interior 4 of the reservoir.

The joint material, after having been injected while in a liquid state, cools while giving up heat, which is transferred at least in part to the edges of reservoir parts 1 and 2. This heat energy is insufficient to remelt the material of the reservoir part edges completely but does suffice to soften, or possibly locally remelt, the surface of at the edges, this occurring more easily and reliably since the crystallization of the material of the reservoir parts at the location of the edges has not yet terminated. There is thus established a solid molecular bond between the edges of the reservoir parts and joint 5 which connects them. This effect is even more marked when projecting portions 51 penetrate into the joint. The heat supplied to portions 51 from joint 5 when it is still in the molten state cannot escape through the walls of the mold and serves uniquely to modify the state of the projecting portions. This occurs easily and rapidly in view of the small cross section of the projecting portions and their large heat exchange surface with the joint.

After solidification, the reservoir is ejected from impression 140 at the same time that the new reservoir parts that have been formed in impressions 120 and 130 are gripped by the robot and the cycle recommences. After each cycle, a reservoir is completed without the constituent parts thereof having even been moved away from the molding station.

Figures 5, 6:
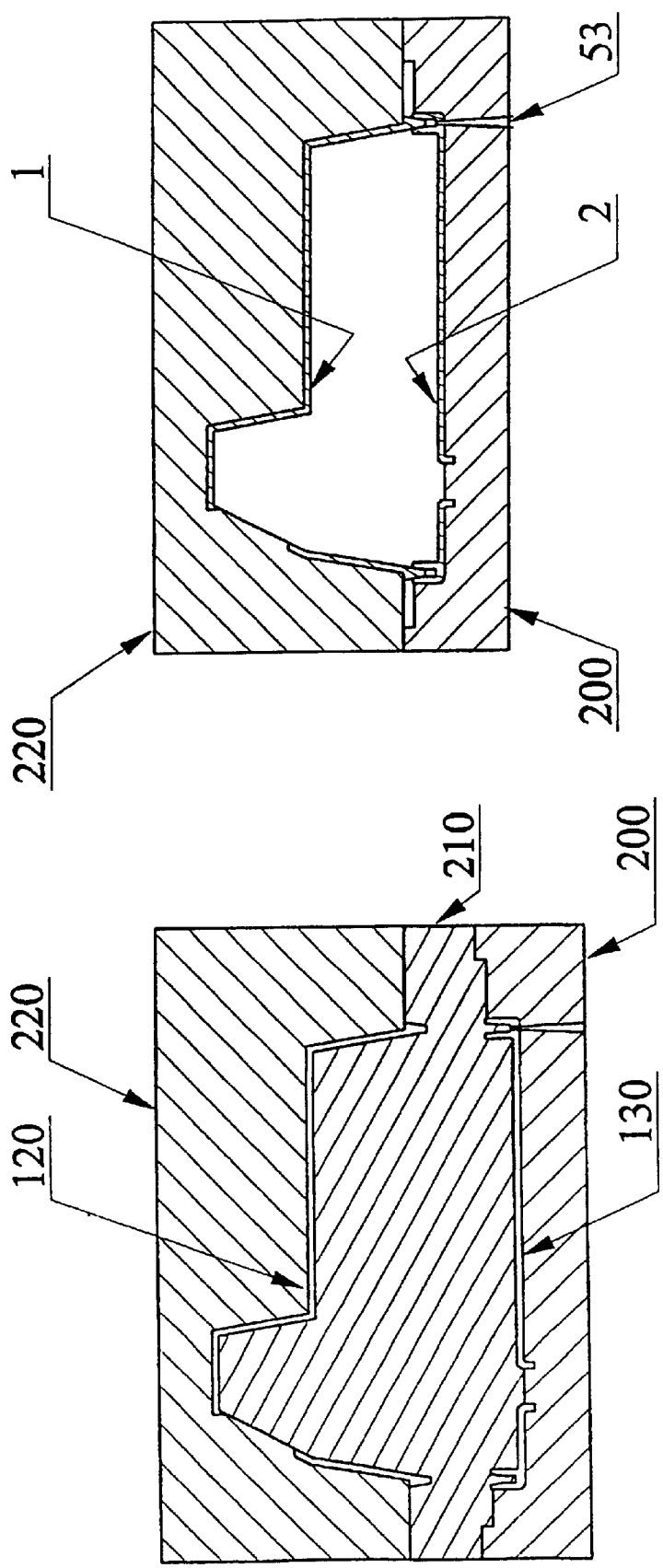
FIGS. 5 and 6 are elevational, cross-sectional views of a second embodiment of a mold used in the practice of the method according the present invention, shown in two operating steps.

According to another version of the process of the invention, a reservoir of the same structure is fabricated in an injection mold as shown in FIG. 5. This mold is made of three parts 200, 210 and 220 aligned along the molding axis, i.e. in the direction of opening and closing movements of the mold parts. These parts provide a molding impression 120 formed between mold parts 210 and 220 for molding an upper part 1 of the reservoir, and a molding impression 130 formed between parts 210 and 200 for forming a lower part 2 of the reservoir. As shown in FIG. 5, central part 210 defines the interior surfaces and the edges of the reservoir parts aligned relative to one another in the same manner that they will be aligned when the reservoir has been fully assembled.

In a first molding step, the mold is closed as shown in FIG. 5, and parts 1 and 2 are injection molded. Then, the mold is opened before complete crystallization of the molded material and the reservoir parts remain in mold parts 220 and 200 with the aid of retainers or other known arrangements, without being ejected. Central part 210 is then withdrawn by conventional hydraulic means (not shown) and the mold is reclosed as shown in FIG. 6. The two injection molded reservoir parts 1 and 2 are then in contact via their mutual bearing face 3 and material is injected to form joint 5 through channels, such as 53, other than those employed for injecting material to form parts 1 and 2. The characteristics of attachment and bonding of the molded joint material to reservoir parts 1 and 2 are identical to those described above with respect to the first embodiment of the method according to the invention.

In this second embodiment, there is essentially no manipulation of the reservoir parts but it is necessary to carry out two molding cycles to produce a finished reservoir. As in the first embodiment, a finished reservoir is produced without requiring the constituent parts to leave the molding station.

Figure 3:
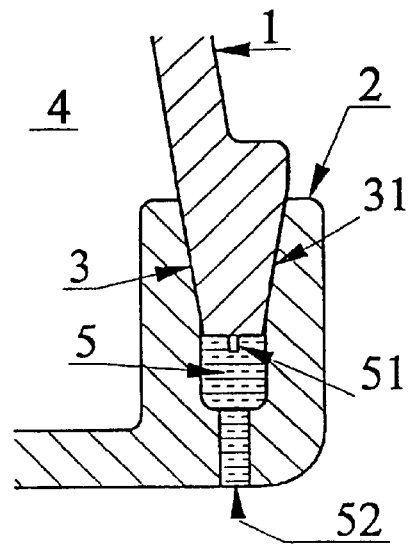

According to a preferred embodiment of the reservoir according to the invention, as shown in FIG. 3 and indicated generally in FIGS. 4–6, the edge of upper part 1 has a tapering cross section with lateral faces serving as portions of mutual bearing faces 3, 31 with respect to lower part 2. Correspondingly, the edge of lower part 2 has a groove with a substantially trapezoidal cross section receiving the edge of upper part 1. The groove is deeper than necessary to receive the entirety of the edge of upper part 1 in order to create a closed space into which the material for forming joint 5 is injected, through one or more channels 52. Preferably, there are a plurality of channels 52 in part 2 distributed around this space. The edge of upper part 1 is provided with at least one projecting portion 51.that will penetrate into joint 5.

The reservoir according to the invention can be produced as indicated above by one of the methods according to the invention. Upon injection of the joint material, the molten material thereof is trapped in the envelope constituted by the edges of the reservoir parts made of plastic material, which reduces the amount of heat exchange with the mold and promotes the heat exchange with the walls of the edges of the reservoir parts. The edge of upper part 1 has, in the configuration shown in FIG. 3, a small contact surface area, but projecting portion 51, which is integral with the edge of part 1, reinforces the bond.

This application relates to subject matter disclosed in French Application Number FR 98 14586, filed on Nov. 17, 1998, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A method for fabricating water reservoirs for clothes pressing irons, each reservoir being composed of two plastic parts, said method comprising:

simultaneously molding the two parts of one reservoir in a first injection molding step in two impressions of the same mold; and assembling the two parts together while, in a second injection molding step, injection molding a joint of plastic material between the two parts to connect the two parts together in a fluid-tight manner, wherein the two parts are assembled together and the second injection molding step is performed before complete crystallization of the two parts.

2. The method of claim 1 wherein the joint and the two parts of the reservoir are made of identical material or of materials that compatible with one another in order to form alloys or to adhere together.

3. The method of claim 2 wherein, in the first injection molding step, the two parts of the reservoir are molded in two impressions of the mold, and wherein said method further comprises, between said first and second molding steps, ejecting the two parts from the mold before complete crystallization of the two parts, removing the two parts from the two impressions and assembling the two parts in a third impression of the same mold, and wherein the two parts are assembled together and the second injection molding step is performed in the third impression.

4. The method of claim 3 wherein each of the two parts of the reservoir has an edge, the edges of the two parts contact one another along respective bearing faces, and the bearing faces also serve as surfaces for centering the parts relative to one another.

5. The method of claim 4 wherein the edge of a first one of the parts is formed to provide a groove of substantially trapezoidal cross section along the edge, and the edge of the other one of the parts is formed to have a tapered substantially trapezoidal cross section having side surfaces that mate with the groove of the one part, the groove having a bottom and the edge of the other one of the parts having a peak that is spaced from the bottom when the two parts are assembled together.

6. The method of claim 5 wherein the edge of at least one of the parts of the reservoir includes a projecting portion of small cross section with respect to the cross section of the joint, the projecting portion having the form of a blade that penetrates into the joint when the two parts have been assembled together and the joint has been injection molded.

7. The method of claim 1 wherein, in the first injection molding step, the two parts of the reservoir are molded in two impressions of the mold, and wherein said method further comprises, between said first and second molding steps, ejecting the two parts from the mold before complete crystallization of the two parts, removing the two parts from the two impressions and assembling the two parts in a third impression of the same mold, and wherein the two parts are assembled together and the second injection molding step is performed in the third impression.

8. The method of claim 1 wherein each of the two parts of the reservoir has an edge, the edges of the two parts contact one another along respective bearing faces, and the bearing faces also serve as surfaces for centering the parts relative to one another.

9. The method of claim 8 wherein the edge of a first one of the parts is formed to provide a groove of substantially trapezoidal cross section along the edge, and the edge of the other one of the parts is formed to have a tapered substantially trapezoidal cross section having side surfaces that mate with the groove of the one part, the groove having a bottom and the edge of the other one of the parts having a peak that is spaced from the bottom when the two parts are assembled together.

10. The method of claim 1 wherein each of the two parts of the reservoir has an edge, the edge of at least one of the parts of the reservoir includes a projecting portion of small cross section with respect to the cross section of the joint, the projecting portion having the form of a blade that penetrates into the joint when the two parts have been assembled together and the joint has been injection molded.

11. A water reservoir for a clothes pressing iron, said reservoir comprising two plastic parts and a sealing joint joining said two parts together while forming a fluid-tight seal between said two parts, wherein, said two plastic parts and said joint are injection molded, each of said plastic parts has an edge having a bearing and positioning face via which said plastic parts contact one another, said joint is a body that is injection molded onto said edges to join said parts together, and said parts and said joint are made of the same material or materials that are compatible with one another to form alloys or to adhere to one another.

12. The reservoir of claim 11, wherein the edge of at least one of the parts of the reservoir includes a projecting portion of small cross section with respect to the cross section of the joint, the projecting portion having the form of a blade that penetrates into the joint when the two parts have been assembled together and the joint has been injection molded.

13. A water reservoir for a clothes pressing iron, said reservoir comprising two plastic parts and a sealing joint joining said two parts together while forming a fluid-tight seal between said two parts, wherein, said two plastic parts and said joint are injection molded, each of said plastic parts has an edge having bearing and positioning faces via which said plastic parts contact one another, said joint is a body that is injected molded onto said edges to join said parts together, and the edge of a first one of the parts is formed to provide a groove of substantially trapezoidal cross section along the edge, and the edge of the other one of the parts is formed to have a tapered substantially trapezoidal cross section having side surfaces that mate with the groove of the one part, the groove having a bottom and the edge of the other one of the parts having a peak that is spaced from the bottom when the two parts are assembled together.

14. The reservoir of claim 13, wherein the edge of at least one of the parts of the reservoir includes a projecting portion of small cross section with respect to the cross section of the joint, the projecting portion having the form of a blade that penetrates into the joint when the two parts have been assembled together and the joint has been injection molded.

* * * * *